US012571473B2

(12) United States Patent
Huennekens

(10) Patent No.: US 12,571,473 B2
(45) Date of Patent: Mar. 10, 2026

(54) SEAL ASSEMBLY AND ROLLER

(71) Applicant: ANDRITZ KUESTERS GMBH, Krefeld (DE)

(72) Inventor: Andre Huennekens, Straelen (DE)

(73) Assignee: ANDRITZ KUESTERS GMBH, Krefeld (DE)

( * ) Notice: Subject to any disclaimer, the term of this patent is extended or adjusted under 35 U.S.C. 154(b) by 61 days.

(21) Appl. No.: 18/695,817

(22) PCT Filed: Sep. 27, 2022

(86) PCT No.: PCT/EP2022/076758
§ 371 (c)(1),
(2) Date: Mar. 27, 2024

(87) PCT Pub. No.: WO2023/052324
PCT Pub. Date: Apr. 6, 2023

(65) Prior Publication Data
US 2025/0129848 A1      Apr. 24, 2025

(30) Foreign Application Priority Data
Sep. 28, 2021     (DE) ..................... 10 2021 125 138.9

(51) Int. Cl.
F16C 13/02        (2006.01)
F16J 15/00        (2006.01)
F16J 15/34        (2006.01)

(52) U.S. Cl.
CPC ............. F16J 15/002 (2013.01); F16C 13/02 (2013.01); F16J 15/3464 (2013.01)

(58) Field of Classification Search
CPC .... F16J 15/002; F16J 15/3464; F16J 15/3404; F16J 15/38; F16C 13/02; F16C 2322/12; B21B 31/078
See application file for complete search history.

(56) References Cited

U.S. PATENT DOCUMENTS 2,990,202  A  *   6/1961  Dennison ............. F16J 15/3404
                                                              277/408
3,050,319  A  *   8/1962  Colby ...................... F16J 15/38
                                                              277/374

(Continued)

FOREIGN PATENT DOCUMENTS

CN        103206413  B      9/2015
DE            577292  A      5/1933

(Continued)

*Primary Examiner* — Eugene G Byrd
(74) *Attorney, Agent, or Firm* — Norman B. Thot

(57)                ABSTRACT

A seal assembly includes a primary seal unit which seals off a first space from a second space, and a dam seal unit which delimits the second space from a discharge space so that a liquid introduced into the second space is dischargable into the discharge space. The primary seal unit includes a guide ring having a first lateral surface with a length, a rotating face which is guided on the guide ring, a retaining ring having a second lateral surface, and a secondary seal which acts between the guide ring and the retaining ring. The retaining ring is displaceable relative to the guide ring in a direction of the length of the first lateral surface. The second lateral surface of the retaining ring surrounds the first lateral surface of the guide ring at least over a part of the length of the first lateral surface.

4 Claims, 7 Drawing Sheets

(56)　　　　　References Cited

U.S. PATENT DOCUMENTS

| | | | | |
|---|---|---|---|---|
| 3,109,660 | A * | 11/1963 | Wahl | F16J 15/38 |
| | | | | 277/925 |
| 3,184,244 | A * | 5/1965 | Vleet | F16J 15/38 |
| | | | | 277/399 |
| 4,026,564 | A * | 5/1977 | Metcalfe | F16J 15/3404 |
| | | | | 277/398 |
| 4,538,820 | A * | 9/1985 | Duffee | F16J 15/3464 |
| | | | | 277/398 |
| 10,030,528 | B2 * | 7/2018 | Miller | F02C 7/28 |
| 10,865,653 | B2 * | 12/2020 | De La Bruere Terreault | |
| | | | | F16J 15/3444 |
| 2005/0230921 | A1 * | 10/2005 | Zagres | F16J 15/006 |
| | | | | 277/361 |
| 2018/0017167 | A1 * | 1/2018 | Ryan | F16J 15/3412 |
| 2019/0078569 | A1 * | 3/2019 | Vasagar | F04D 29/106 |
| 2019/0249559 | A1 * | 8/2019 | Sonokawa | F16J 15/441 |
| 2019/0316595 | A1 * | 10/2019 | Grann | F04D 29/12 |
| 2019/0353288 | A1 * | 11/2019 | Hoeting | F16C 33/7886 |
| 2020/0300369 | A1 * | 9/2020 | Zhao | F16J 15/3452 |
| 2020/0386168 | A1 * | 12/2020 | Nasman | F16J 15/3404 |
| 2020/0386318 | A1 * | 12/2020 | Nasman | F16J 15/3404 |
| 2021/0140547 | A1 * | 5/2021 | Sonokawa | F01D 25/183 |
| 2021/0156390 | A1 * | 5/2021 | Milan | F04D 29/126 |
| 2021/0332758 | A1 * | 10/2021 | Nasman | F16C 37/007 |

FOREIGN PATENT DOCUMENTS

| | | | | |
|---|---|---|---|---|
| DE | 3343313 | A1 | 6/1985 | |
| DE | 3639935 | | 6/1988 | |
| DE | 100 35 804 | A1 | 2/2002 | |
| DE | 10 2006 045 993 | A1 | 4/2008 | |
| DE | 10 2007 013 917 | A1 | 9/2008 | |
| DE | 102009059305 | A1 * | 6/2011 | D21G 1/022 |
| DE | 10 2010 017 620 | A1 | 12/2011 | |
| EP | 3 819 528 | A1 | 5/2021 | |
| GB | 2 028 439 | A | 3/1980 | |
| JP | 2002-98237 | A | 4/2002 | |
| WO | WO 2017/119882 | A1 | 7/2017 | |

* cited by examiner

SEAL ASSEMBLY AND ROLLER

CROSS REFERENCE TO PRIOR APPLICATIONS

This application is a U.S. National Phase application under 35 U.S.C. § 371 of International Application No. PCT/EP2022/076758, filed on Sep. 27, 2022 and which claims benefit to German Patent Application No. 10 2021 125 138.9, filed on Sep. 28, 2021. The International Application was published in German on Apr. 6, 2023 as WO 2023/052324 A1 under PCT Article 21(2).

FIELD

The present invention relates to a seal assembly comprising a primary seal unit, which seals off a first space from a second space, and a dam seal unit, which delimits the second space from a discharge space and which is designed so that liquid introduced into the second space can be discharged into the discharge space via the dam seal unit.

BACKGROUND

Such a seal assembly is described in DE 10 2010 017 620 A1.

This seal assembly is, for example, in a roller comprising a rotating hollow roller which forms the working roller circumference; a crosshead which penetrates the hollow roller lengthways and circumferentially leaves a distance from the inner circumference of the hollow roller and to which external forces can be applied via at least one support at the ends protruding out of the hollow roller and on which the hollow roller is supported via a pressure and heat transfer liquid situated in the interstice between the hollow roller and the crosshead; a bearing bell which is arranged outside each end of the hollow roller and which has a region of large inner diameter and an axially adjacent region of smaller inner diameter toward the outer end of the roller, into which region of smaller diameter the crosshead extends, wherein in the region of reduced inner diameter the bearing bell fits around the end of the crosshead there in a play-free manner on a supporting length and is supported thereon, and wherein the external forces of the support act on the bearing bell; an axial projection on each end of the hollow roller, which projection is reduced in an outer diameter relative to the diameter of the hollow roller and engages axially with radial play in the bearing bell in its region of large inner diameter, wherein a rotary bearing is arranged on each end of the hollow roller in the engagement region between the outer side of the projection and the bearing bell, on which rotary bearing the hollow roller is supported rotatably relative to the bearing bell; and a seal assembly, which is arranged on the end of the axial projection axially outside the rotary bearing and which seals off a first space between the end of the crosshead projecting out of the hollow roller and the inner circumference of the projection from a second space which is formed by the interior of the region of large diameter of the bearing bell and is adjacent to a discharge space.

The present invention also relates to such a roller.

In an embodiment of such a roller which is described in DE 36 39 935 A1, the bearing on which the hollow roller is supported relative to the bearing bell is sealed off from a chamber which surrounds the primary seal unit via a seal assembly. It should therefore be possible for a different medium to be used for the bearing lubrication than is used as the pressure and heat transfer liquid.

To cool the primary seal unit, which heats up not only when the roller is heated but also as a result of the friction produced during operation of the roller, a supply line is provided which opens into the chamber and via which nitrogen can be supplied to the chamber.

It has been found in practice that the primary seal unit in such a roller, which often comprises rotating faces which slide on one another, is subject to considerable wear, in particular with increasing operating speed of the roller, which is attributable to high local temperatures of components of the primary seal unit despite the cooling and due to the fact that, despite the nitrogen supply, a cracking of leakage oil occurs, which can pass between sealing faces of the primary seal unit and thereby damage it.

To reduce the wear of the rotary seal in particular at high speeds and temperatures of the pressure and heat transfer medium, DE 100 35 804 A1 describes a roller in which the bearing on which the hollow roller is supported rotatably relative to the bearing bell is lubricated with the pressure and heat transfer liquid. Mineral thermal oils are often used therefor.

To achieve a sufficient lubricating effect via these thermal oils, which have a very low viscosity in particular at elevated temperatures of up to 250° C. and are under pressures of up to 5 bar, the bearing is supplied with a pressure and heat transfer liquid via a circuit which is integrated between the supply line and the drain and into which cooling devices may be integrated. Since different media are not used as the pressure and cooling medium and as the lubricant for the bearing, this roller dispenses with any sealing between the bearing and the primary seal unit which comprises rotating faces which slide on one another.

To cool the primary seal unit and to avoid the formation of cracked material, the rotating faces are supplied with pressure and heat transfer liquid from the outside. The external surroundings of the rotating faces are as a result always provided with pressure and heat transfer liquid, any cracked material is flushed away, the rotating faces are cooled, and an oil neck of cold oil is produced on the outside of the sealing gap formed by the rotating faces, which oil neck has less of a tendency to react with atmospheric oxygen than a leak exiting from the sealing gap. Despite the simplified design and the associated possibility of using the same medium as a pressure and heat transfer liquid and as a lubricant for the bearing, it has been found that a sufficient service life of the rotating faces of the primary seal assembly can be achieved.

It has, however, proven disadvantageous that the primary seal assembly must allow radial displacements of up to +/−2 mm, angular displacements of up to +/−2°, and axial displacements of up to 10 mm of the components to be sealed off from one another (axial projection and crosshead or bearing bell), due to the thermal expansion of the hollow roller and the bending of the hollow roller and the crosshead under load. In this embodiment, a bellows has therefore been provided for this purpose between the bearing bell and the non-rotating components of the primary seal assembly. It has been found in practice that a welded bellows must be used instead of a rolling bellows due to the manufacturing accuracy that can be achieved therewith. The welding of this bellows is very demanding, and the connection of the bellows to the connection parts is at risk of fracture. The design of the seal assembly described in DE 100 35 804 A1 and the roller provided therewith is correspondingly complex and also susceptible to failure. The cooling of the primary seal assembly by supplying pressure and heat transfer liquid from outside also reaches its limits with increasing sliding speeds of the rotating faces upward of approximately 7.5 m/s due to the correspondingly increasing centrifugal forces.

A further design of a seal assembly and a roller equipped therewith of the type in question is described in DE 10 2009 059 305 A1.

In this design, the bellows is replaced by a more cost-effective secondary seal that is simpler to produce in order to reduce manufacturing outlay. This secondary seal does not seal rotationally, but dynamically where necessary, due to the displacements produced during operation of the roller, so that leaks also occur in this case, and this seal is likewise at risk of being damaged by cracked material. To counteract this risk, a flow of pressure and heat transfer liquid is applied from the outside via a first line, not only to the primary seal unit, which again comprises rotating faces, but also to the secondary seal via a second line.

This embodiment of the seal assembly and roller is disadvantageous in that the flow of pressure and heat transfer liquid to be supplied from the outside is considerably increased. This can result in undesirable accumulations in discharges for this flow and for leakage flow of pressure and heat transfer liquid. This embodiment also reaches its limits at sliding speeds of the rotating faces of the primary seal unit above 7.5 m/s due to centrifugal forces.

A further embodiment of a seal assembly and a roller equipped therewith is described in DE 10 2007 013 917 A1.

In this embodiment, the primary seal unit and the secondary seal unit are formed by a so-called double mechanical seal. In this case, two radially or axially mutually spaced rotating faces interact with one or more counter rotating faces. The two rotating faces form the second space between them. Only one of the two rotating faces, also referred to as a "first rotating face", is in contact with hot pressure and heat transfer liquid during operation of the roller. Cooled pressure and heat transfer liquid is applied to the second space between the first rotating face and the other rotating face, which is correspondingly referred to as the "second rotating face", during operation. The second space is accordingly also referred to here as the "quench". As a result, the leakage of hot pressure and heat transfer liquid overcoming the first rotating face does not come into contact with atmospheric oxygen, and therefore the formation of cracked material on this first rotating face is avoided. Since the supply of cooled pressure and heat transfer liquid into the quench on the second rotating face only results in a leak of pressure and heat transfer liquid that has a temperature lower than the approximately 80° C. critical for cracking, the production of cracked material is also effectively avoided on the second rotating face.

This embodiment is, however, disadvantageous in that supply and discharge lines for cooled pressure and heat transfer liquid are necessary both for the first rotating face and for the second rotating face. The production costs for such a double mechanical seal are also high because the secondary seal unit has the same requirements for material and manufacturing accuracy as the primary seal unit.

A further embodiment of a seal assembly and a roller of the type in question is described in DE 10 2010 017 620 A1. This seal assembly and this roller comprise a dam seal as the secondary seal unit instead of the second mechanical seal. The second space formed between the primary seal unit and the dam seal is again in the form of a quench into which cooled pressure and heat transfer liquid is introduced, which can be discharged completely into the discharge space via the dam seal. In other words, the dam seal is designed so that it dams the liquid introduced into the quench but allows passage from the quench into the discharge space once a certain pressure in the quench is reached. The pressure and heat transfer liquid introduced into the quench is used not only for cooling the components of the primary seal unit, but also for reducing the temperature of any leaks so that cracking is prevented on contact with oxygen when the dam seal is overcome.

It is here disadvantageous that, analogous to the embodiment of DE 100 35 804 A1, a bellows is required to seal off the part of the primary seal unit on the rotating face side from the bearing bell, in other words, to prevent pressure and heat transfer liquid being able to escape by bypassing the seal gap formed between the rotating face and the counter face. It is also disadvantageous that the realization of the dam seal in practice is likewise very complex for it to achieve the desired properties, specifically the passage of the pressure and heat transfer liquid at least upward of a predefinable overpressure of the second space in the form of a quench in the discharge space. Suitable attendant parameters must in practice be maintained therefore. The dam seal must also be sprung and secured against rotation.

SUMMARY

An aspect of the present invention is to develop a seal assembly described in DE 10 2010 017 620 A1 and a roller having this seal assembly which is suitable for supporting the hollow roller while remaining suitable for the use of thermal oils under a temperature of up to 250° C. and a pressure of up to 5 bar where the thermal oil can also be used for bearing lubrication.

In an embodiment, the present invention provides a seal assembly which includes a primary seal unit which is configured to seal off a first space from a second space, and a dam seal unit which is configured to delimit the second space from a discharge space and so that a liquid introduced into the second space is dischargable into the discharge space via the dam seal unit. The primary seal unit comprises a guide ring which comprises a first lateral surface having a length, a rotating face which is guided on the guide ring, a retaining ring which comprises a second lateral surface, and a secondary seal which is configured to act between the guide ring and the retaining ring. The retaining ring is configured to be displaceable relative to the guide ring in a direction of the length of the first lateral surface. The second lateral surface of the retaining ring is arranged to surround the first lateral surface of the guide ring at least over a part of the length of the first lateral surface.

BRIEF DESCRIPTION OF THE DRAWINGS

The present invention is described in greater detail below on the basis of embodiments and of the drawings in which.

DETAILED DESCRIPTION

Figure 1:
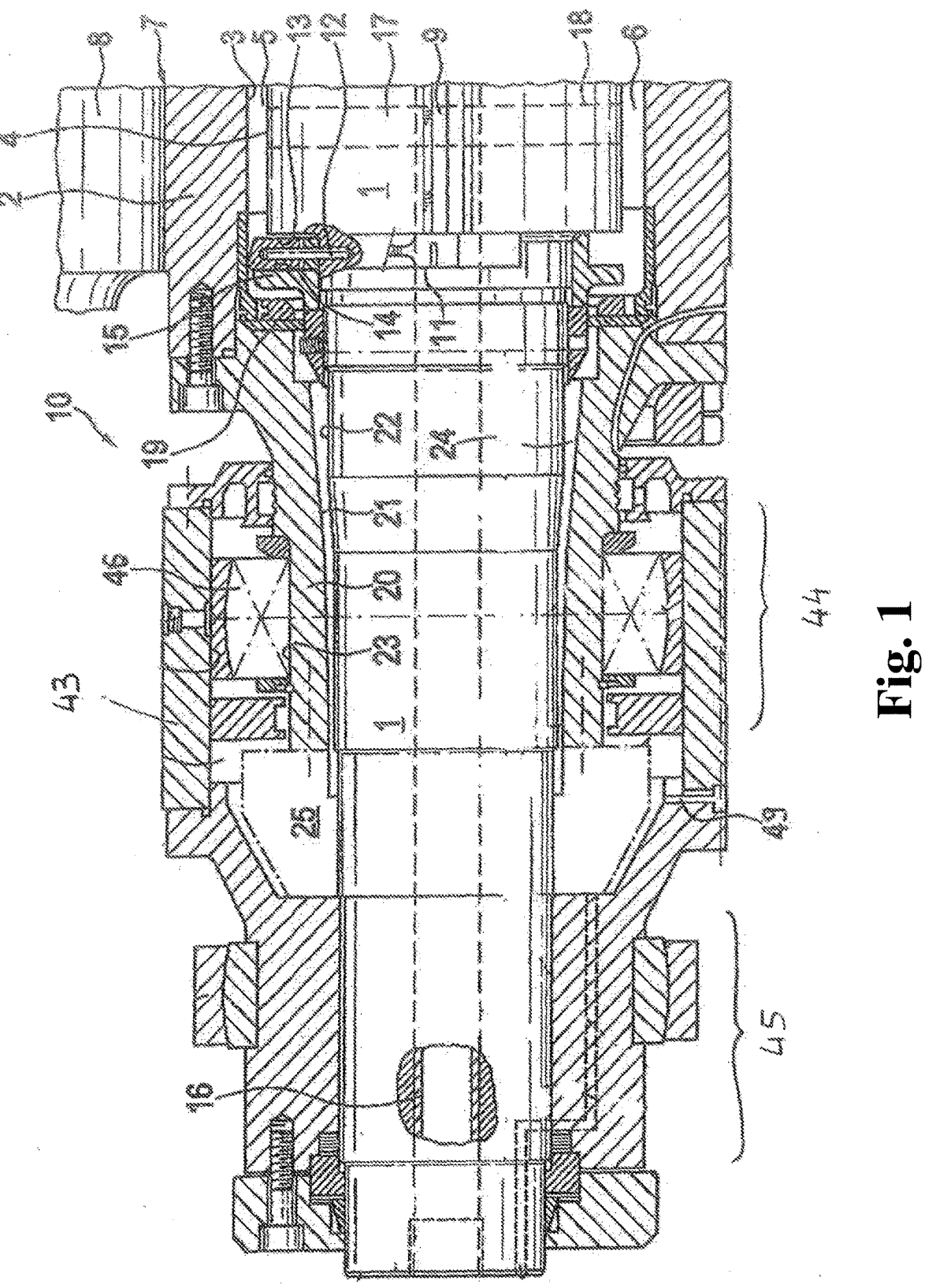
FIG. 1 schematically shows a partial longitudinal section through the left end of an exemplary embodiment of a roller in which the seal assembly according to the present invention can be used.

In the seal assembly according to the present invention, the primary seal unit comprises a rotating face which is guided on a guide ring which has a first, for example, an outer lateral surface having a length, the first lateral surface of the guide ring being surrounded at least over part of its length by a second, for example, an inner lateral surface of a retaining ring which can be displaced relative to the guide ring in the direction of the length, and a secondary seal acting between the guide ring and the retaining ring is provided.

In an embodiment of the present invention, the first lateral surface of the guide ring can, for example, have two regions with different diameters which are separated from one another by a step.

The second lateral surface of the retaining ring can then, for example, comprise a radial protrusion.

The second lateral surface can, for example, have an inner diameter which is slightly larger than the outer diameter of the region of smaller diameter, and the radial protrusion can, for example, have an inner diameter which is slightly larger than the outer diameter of the region of small diameter of the lateral surface of the guide ring. "Slightly smaller or larger" means a size difference which allows an at least virtually frictionless relative displaceability of the corresponding components.

It has surprisingly been found that a bellows is not needed due to the design according to the present invention. The present invention has recognized that any leak of the secondary seal acting between the outer lateral surface of the guide ring and the inner lateral surface of the retaining ring can be tolerated without the function of the seal assembly being impaired. The present invention therefore represents a departure from the previous idea that either the sealing gap formed by a first rotating face must be flushed with hot pressure and heat transfer liquid or a quench must be created and measures taken which provide that no pressure and heat transfer liquid passes from the first to the second space except for by leakage of the first sealing gap.

The secondary seal can, for example, be provided between the step and the radial protrusion.

If the secondary seal comprises an elastomeric seal component, it can, for example, be provided in a particularly cost-effective way.

The secondary seal can in particular comprise a U-cup seal, which can be produced in particular from a PTFE compound material.

The secondary seal can, for example, comprise a sealing ring, for example, an O-ring. Examples of materials are nitrile butadiene rubber (NBR), hydrogenated acrylonitrile butadiene rubber (HNBR), fluorocarbon rubber (FPM), perfluorocarbon rubber (FFKM), tetrafluoroethylene propylene copolymer rubber (FEPM), silicone rubber (VMQ), and fluorosilicone rubber (FVMQ). A sealing ring which contains a perfluorocarbon rubber (FFKM) can, for example, be used.

The sealing ring can, for example, be configured as a sheathed sealing ring with a core and a sheath, wherein the core comprises fluorocarbon rubber (FPM) and/or silicone rubber (VQM), and the sheath comprises at least one material from the group of polytetrafluoroethylene (PTFE), fluoroethylene propylene (FEP), and perfluoroalkoxy (PFA). Such a sealing ring has particularly good elastic properties due to the core material and particularly low friction coefficients and high wear resistance owing to the sheath material.

The secondary seal can be formed particularly simply and acts reliably when it, for example, comprises a sealing ring which is mounted in an annular groove which is provided in the second lateral surface of the retaining ring or in the first lateral surface of the guide ring. This sealing ring then interacts with the first lateral surface of the guide ring or with the second lateral surface of the retaining ring.

The seal assembly according to the invention can, for example, comprise a spring element via which the rotating face is pressed against a counter sealing ring.

For this purpose, the spring element can, for example, be arranged to act between the retaining ring and the guide ring.

For this purpose, the spring element can, for example, be displaced in a receptacle of the retaining ring and act against a shoulder of the guide ring.

The dam seal unit can, for example, comprise at least one piston ring and/or laminar ring (trade name "FEY ring") and/or shaft sealing ring and/or split ring. If the dam seal unit comprises a shaft sealing ring, this can, for example, be installed so that an overpressure in the second space reduces the sealing effect with respect to the discharge space.

To avoid a situation in which an undesired overpressure can form between the second space and the discharge space, an overflow duct connecting the second space and the discharge space can, for example, be provided.

The dam seal unit can furthermore comprise an overpressure valve which connects the second space to the discharge space upward of a certain pressure. This is advantageous when, due to the configuration of the dam seal or the provision of the overflow duct itself, it cannot be provided that pressure and heat transfer liquid will pass via the dam seal at least upward of a certain difference between the pressure in the second space and the discharge space.

To improve the lubricating effect of the pressure and heat transfer liquid between the rotating face and the counter face, the rotating face and the counter face can be arranged eccentrically to one another.

The roller according to the present invention comprises the above-described seal assembly.

The retaining ring can, for example, then be arranged in a rotationally fixed manner on the bearing bell, and the guide ring can, for example, be arranged displaceably relative to the retaining ring in the direction of the length, as a result of which a subassembly comprising the retaining ring, the guide ring, and the rotating face are stationary during operation of the roller. During operation of the roller, the counter face arranged in a rotationally fixed manner on one of the axial projections of the hollow roller then rotates relative to this subassembly.

The present invention is described in greater detail below with reference to the attached drawings.

The roller denoted as a whole with 10 in FIG. 1 comprises a stationary crosshead 1 in the form of a substantially solid and cylindrical support around which a hollow roller 2 rotates, leaving a distance between its inner circumference 3 and the outer circumference 4 of the crosshead 1. The cylindrical interstice between the inner circumference 3 of the hollow roller 2 and the outer circumference 4 of the crosshead 1 is divided into a pressure chamber 5 situated on the side of the roller gap 7, i.e., on the side of a counter roller 8, and into a leakage chamber 6 situated on the opposite side, specifically by longitudinal seals 9, which are arranged on the crosshead 1, bear sealingly against the inner circumference 3 of the hollow roller 2 and are arranged on both sides of the crosshead 1, and only a front longitudinal seal 9 of which can be seen in the drawing. The pressure chamber 5 and the leakage chamber 6 therefore have approximately the shape of cylindrical half shells, and the pressure chamber 5 is closed at both ends by end transverse seals 11. In the exemplary embodiment, the end transverse seals 11 have the shape of half rings which extend over the upper half of the crosshead 1 and bear with their outer circumference against the inner circumference 3 of the hollow roller 2. The end transverse seals 11 are guided on guide pins 12 which extend perpendicular to the axis of the crosshead 1 in the plane of action, i.e., in the plane in which the resultant of the forces exerted by the pressure liquid in the pressure chamber 5 lies. This plane of action coincides in many cases with the connection plane of the axis of the hollow roller 2 and of the axis of the counter roller 8.

The end transverse seal 11 has a substantially rectangular cross section and bears with one flank against a projection 13 of the crosshead 1 and with the other flank against the flank 14 of a retaining ring 15 held by the guide pin 12 from the crosshead 1.

The longitudinal seals 9 on the two sides form, together with the end transverse seals 11 attached to the two ends of the hollow roller 2, the pressure chamber 5, which can be supplied with an optionally heated pressure and heat transfer liquid via an insulated supply line 16, which opens into an inlet 17 on the top of the crosshead 1. The pressure and heat transfer liquid, usually a thermal oil, flows in the longitudinal pressure chamber 5 to the right according to FIG. 1, passes close to that end of the longitudinal pressure chamber 5 through a transverse duct into the leakage chamber 6, and flows therein to the left again in order to be extracted again at the outlet 18 and an outlet duct (not shown).

In the shown exemplary embodiment, the leakage chamber 6 is not terminated to the left by an end transverse seal, and pressure liquid can therefore pass past the outlet 18 to the left beyond the projection 13. A repelling ring 19 is provided to maintain the main amount of pressure and heat transfer liquid in the leakage chamber 6, the repelling ring 19 deflecting inflowing liquid back into the leakage chamber 6, from where it is discharged via the outlet 18.

A sleeve-like projection 20 is fastened to the end of the hollow roller 2 and continues the hollow roller 2, and the outer circumference 23 thereof has a smaller diameter than the outer diameter of the hollow roller 2. The inner circumference 21 of the projection 20 leaves a small distance from the outer circumference 22 of the end of the crosshead 1 protruding out of the hollow roller 2. A distance space, referred to below as the first space 24, is thus formed, into which small portions of the pressure and heat transfer liquid can pass out of the leakage chamber 6 when they have overcome the repelling ring 19. A substantial flow cannot, however, take place in the first space 24 because this is delimited at the left end in the drawing by a seal assembly according to the present invention, which is denoted as a whole with 25.

A bearing bell 43 is provided to support the hollow roller 2 on the crosshead 1. The bearing bell 43 has a region 44 of larger inner diameter which faces the outer circumference 23 of the projection 20. The bearing bell 43 also has a region 45 of smaller inner diameter via which it is mounted on the crosshead 1.

A rotary bearing 46 is arranged between the projection 20 and the bearing bell 43 in the region 44 via which rotary bearing 46 the projection 20 is mounted rotatably relative to the crosshead 1. It is self-evident that the right end (which is not shown in the drawing) can be designed in a corresponding manner.

Exemplary embodiments of a seal assembly 25 according to the present invention are shown in FIGS. 2 to 5. The exemplary embodiments comprise a primary seal unit 26, which seals off the first space 24 from a second space 27, and a dam seal unit 28, which delimits the second space 27 from a discharge space 29. The dam seal unit 28 is designed so that liquid introduced into the second space can be discharged via the dam seal unit 28 into the discharge space 29.

The primary seal unit 26 comprises a rotating face 30, which is guided on a guide ring 31 which has a first lateral surface 32 with a length L, which is formed by the outer lateral surface of the guide ring. The primary seal unit 26 also comprises a retaining ring 33. Retaining ring 33 has a second lateral surface 34 which is formed by the inner lateral surface of the retaining ring 33 which delimits an inner diameter of the retaining ring 33, which is slightly larger than the outer diameter of the guide ring 31 which is delimited by the first lateral surface 32. The retaining ring 33 can thus be displaced relative to the guide ring 31 in the direction R of the length L.

The primary seal unit 26 also comprises a secondary seal 35, which acts between the guide ring 31 and the retaining ring 33. Primary seal unit 26 allows a relative displacement between the retaining ring 33 and the guide ring 31. For this purpose, the secondary seal 35 comprises a seal component in the form of a sealing ring 58 which is provided in an annular groove 59 in the second lateral surface 34 of the retaining ring 33 and which acts against the first lateral surface 32 of the retaining ring 31. In addition to the rotating face 30, which interacts with a counter face 36 fastened to the projection 20, the secondary seal 35 is used to separate the first space 24 from the second space 27. The sealing ring 58 of the secondary seal 35 is designed as a U-cup seal consisting of a PTFE compound material.

A spring element 37 is provided to press the rotating face 30 against the counter face 36 and to provide the sealing effect, the spring element 37 being arranged to act between the retaining ring 33 and the guide ring 31. For this purpose, the spring element 37 comprises a plurality of compressive springs which are mounted in receptacles 38 distributed around the circumference of the retaining ring 33 and which act against a shoulder 39 of the guide ring 31.

Figure 2:
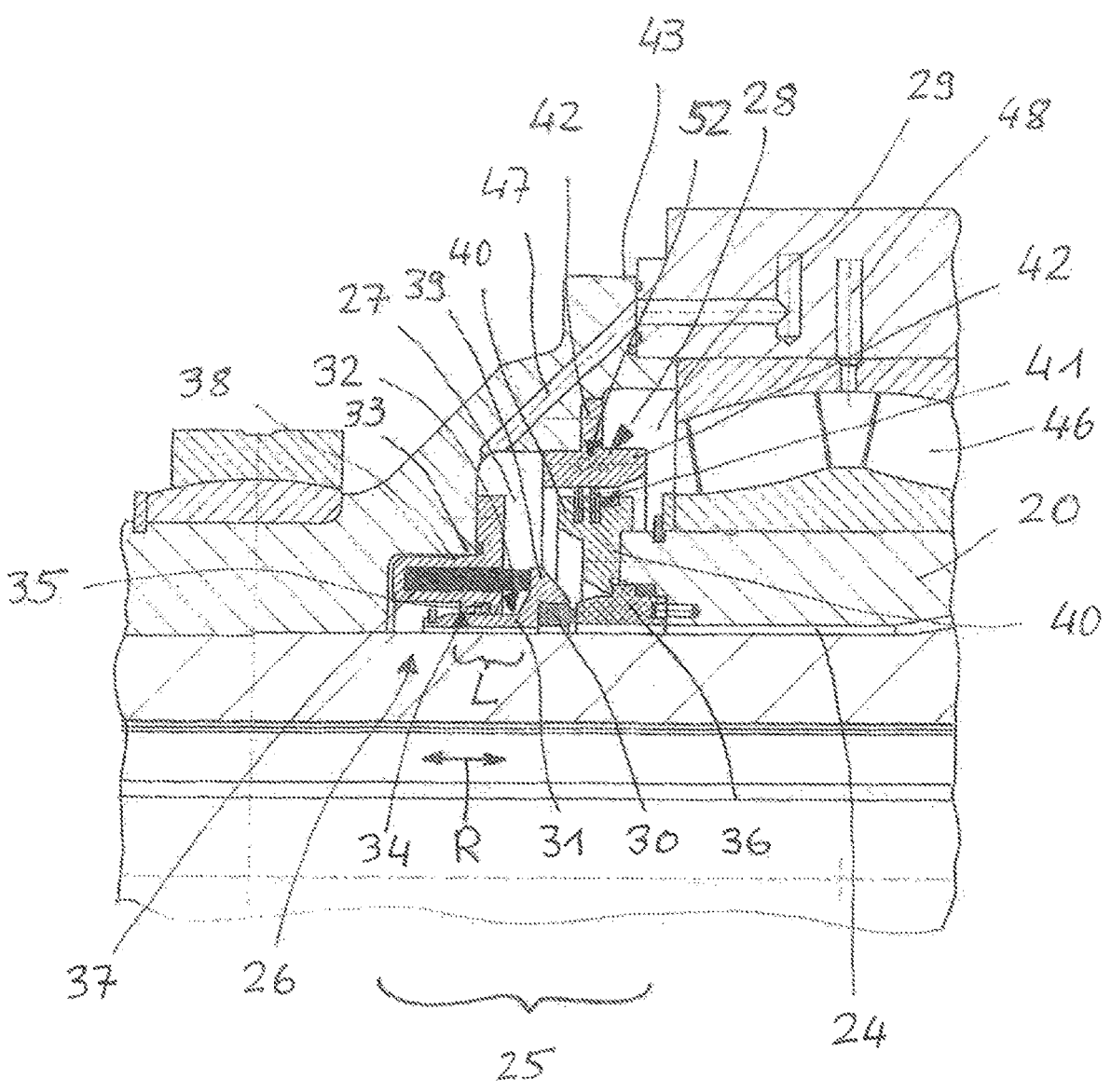
FIG. 2 schematically shows a detail of FIG. 1 with a first exemplary embodiment of a seal assembly according to the present invention.
Figure 3:
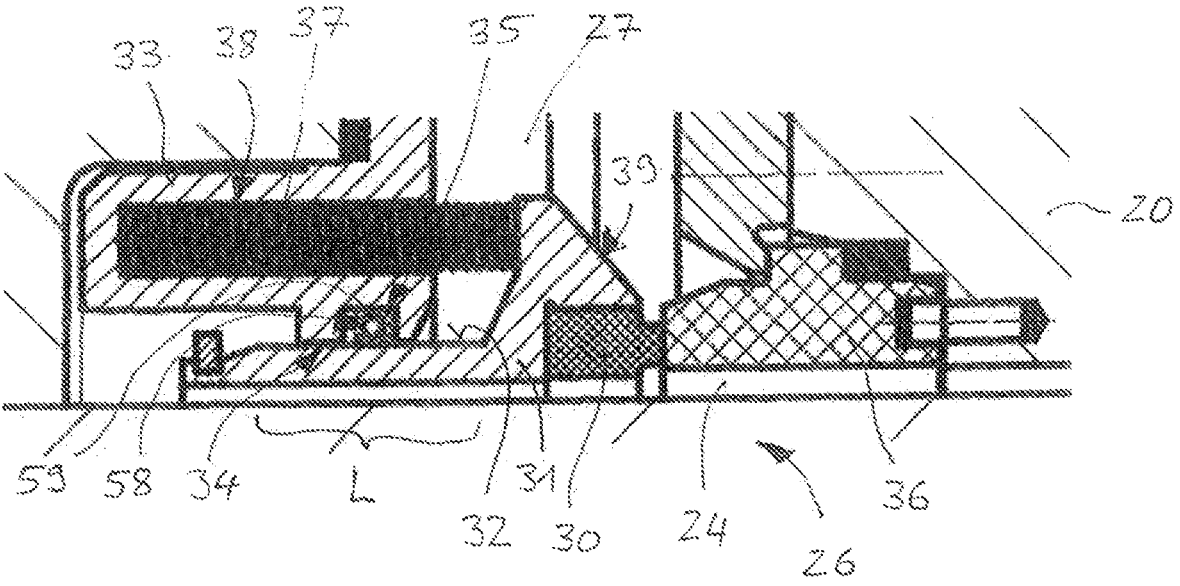
FIG. 3 schematically shows the primary seal unit of FIG. 2 in an enlarged diagram.

In the first exemplary embodiment of the seal assembly according to the present invention shown in FIG. 2, the dam seal unit 28 comprises two laminar sealing rings 41, which are mounted in a flange 40 which is attached to the projection 20 of the hollow roller 2. The laminar sealing rings 41 interact radially with a flange 42 which is fastened to the bearing bell 43.

In the first exemplary embodiment of a seal assembly according to the present invention shown in FIG. 2, to limit the pressure difference which can form between the second space 27 and the discharge space 29, an overpressure valve 52 is provided in the flange 42 which is connected to the bearing bell 43, which overpressure valve 52 opens a connection line between the second space 27 and the discharge space 29 when a predefined pressure difference is exceeded.

During the operation of the roller 10, cooled pressure and heat transfer liquid is conducted into the second space 27 via a supply line 47 in order to be able to cool the components of the primary seal unit 26, in particular rotating face 30, counter face 36, and secondary seal 35, and also any leaks of the primary seal unit 26. A situation is thus effectively avoided in which leaks overcoming the dam seal unit 28 crack on contact with oxygen. Pressure and heat transfer liquid which passes into the discharge space 29 by overcoming the dam seal unit 28 is discharged via a discharge 49 together with pressure and heat transfer liquid which is supplied via a feed 48 to the rotary bearing 46 and, where necessary after processing, fed back to a pressure and heat transfer liquid circuit.

The second exemplary embodiment of a seal assembly 25 according to the present invention shown in FIG. 4 differs from the first exemplary embodiment only in the configuration of the dam seal unit 28, and therefore only the differences shall be described below.

In this second exemplary embodiment, the flange 40 is designed so that it forms a radial sealing face 50. The sealing face 51 of a split ring 53 acts against the radial sealing face 50, leaving a sealing gap 55, which allows a certain passage of pressure and heat transfer liquid from the second space 27 into the discharge space 29. For its mounting, the flange 42 is designed in two parts so that the two end faces of the split ring are partially surrounded laterally by the two parts of the flange 42, and a receiving space 54 for the split ring 53 is formed. In the shown exemplary embodiment, the split ring 53 comprises annular grooves 60 into which sealing rings 61 are inserted on its opposing end faces. In addition to producing sealing effects against the parts of the flange 42, the sealing rings 61 are also used to secure the split ring 53 against rotation in the receiving space 54. Also conceivable is a modification to this embodiment to the effect that the sealing rings 61 are omitted, and a leakage between the end faces of the split ring 53 and the receiving space 54 is also tolerated as long as the total leakage is not greater than the supply of pressure and heat transfer liquid into the second space 27.

Figure 4:
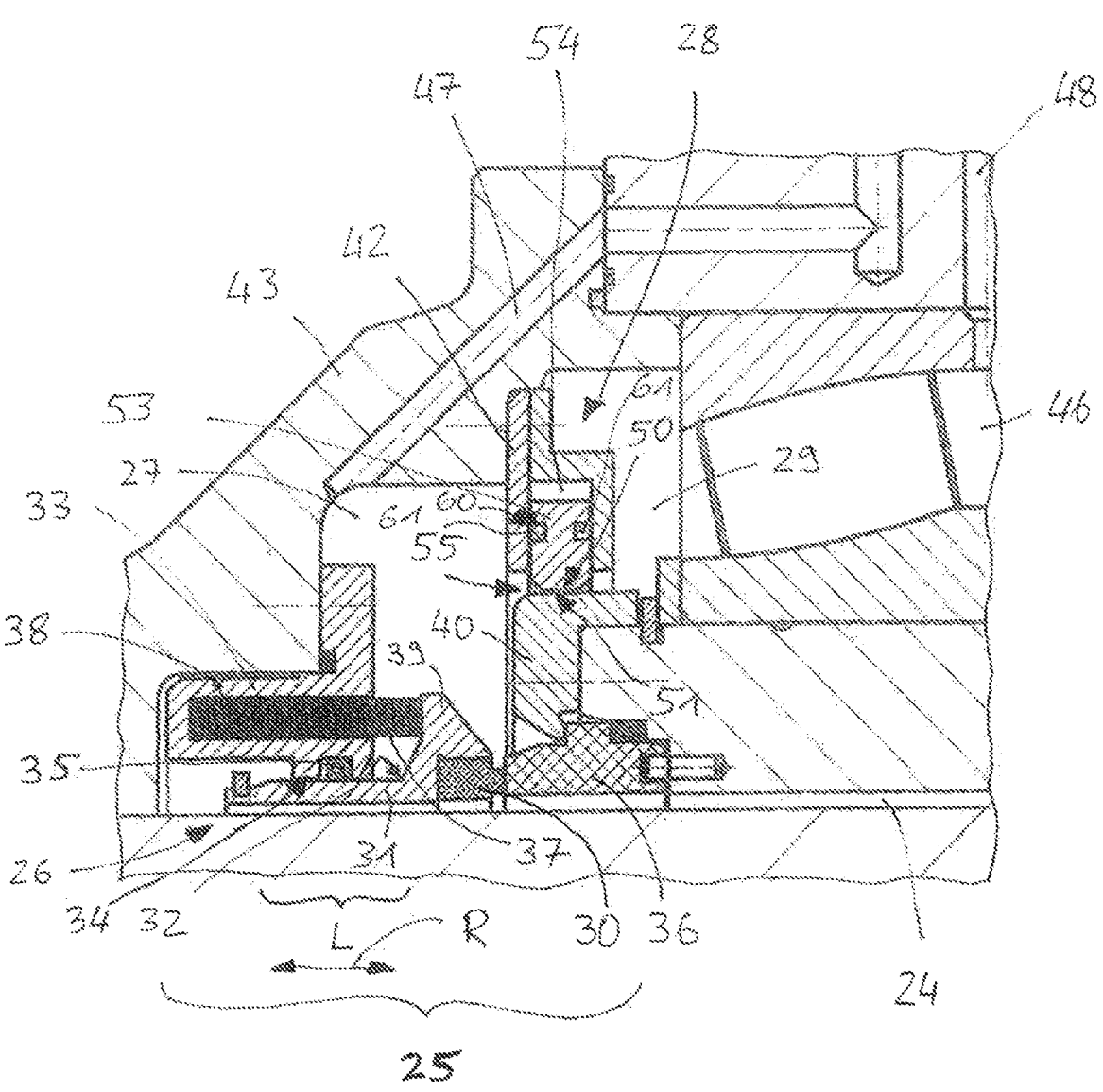
FIG. 4 schematically shows a detail of FIG. 1 with a second exemplary embodiment of a seal assembly according to the present invention.
Figure 5:
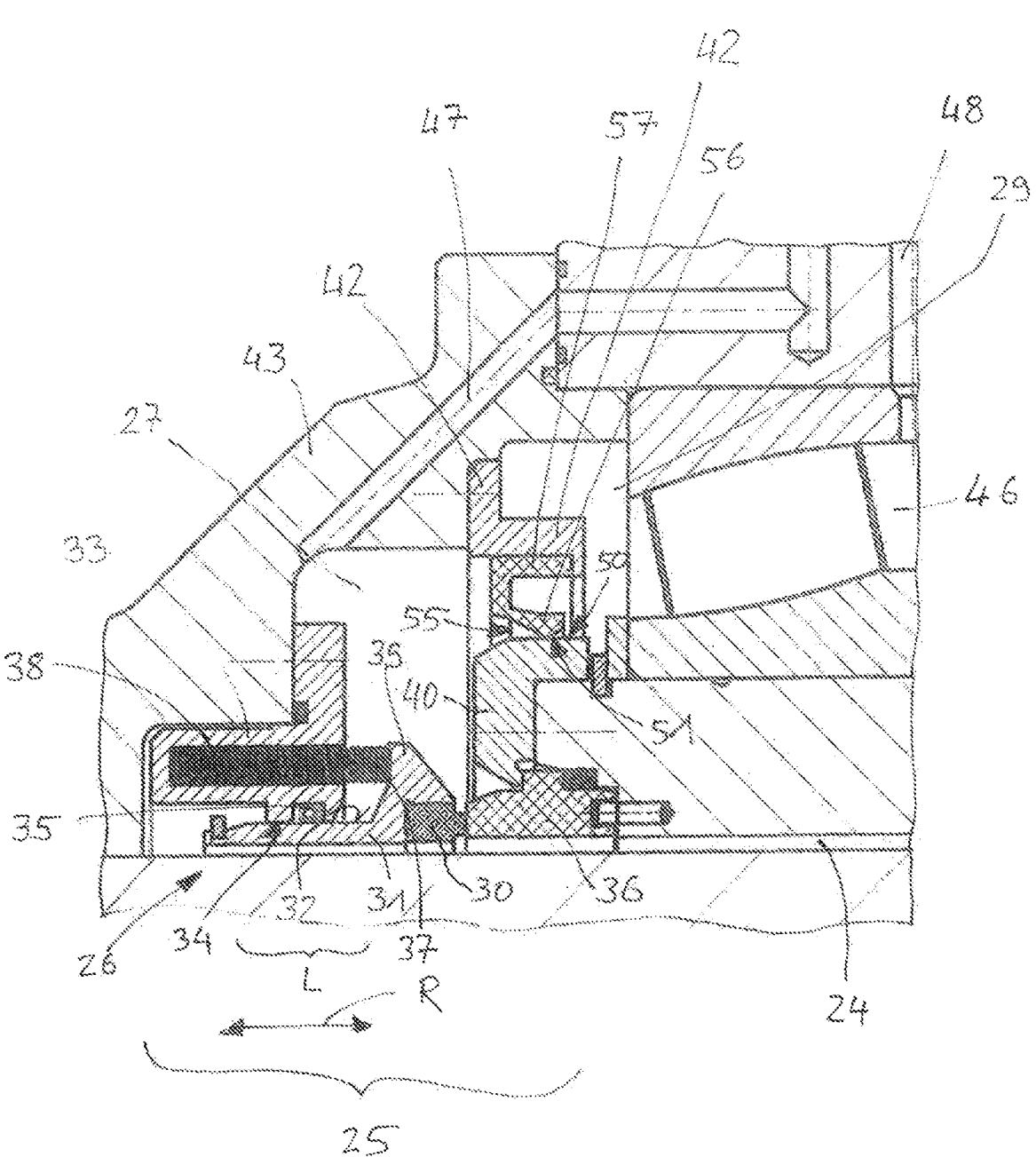
FIG. 5 schematically shows a detail of FIG. 1 with a third exemplary embodiment of a seal assembly according to the present invention.

The third exemplary embodiment of the seal assembly 25 according to the present invention shown in FIG. 5 again differs from the exemplary embodiments shown in FIGS. 2 and 4 only in the formation of the dam seal unit 28. Only the differences shall again be described in order to avoid repetition.

The radial sealing face of the flange 40 interacts with a sealing lip 56 of a shaft sealing ring 57, which is held by the flange 42. The shaft sealing ring 57 is arranged so that, when a certain overpressure in the second space 27 relative to the discharge space 29 is exceeded, the sealing lip 56 lifts off from the sealing face 51 and thus opens a sealing gap 55 formed between the sealing lip 56 and the sealing face 51.

Figure 6:
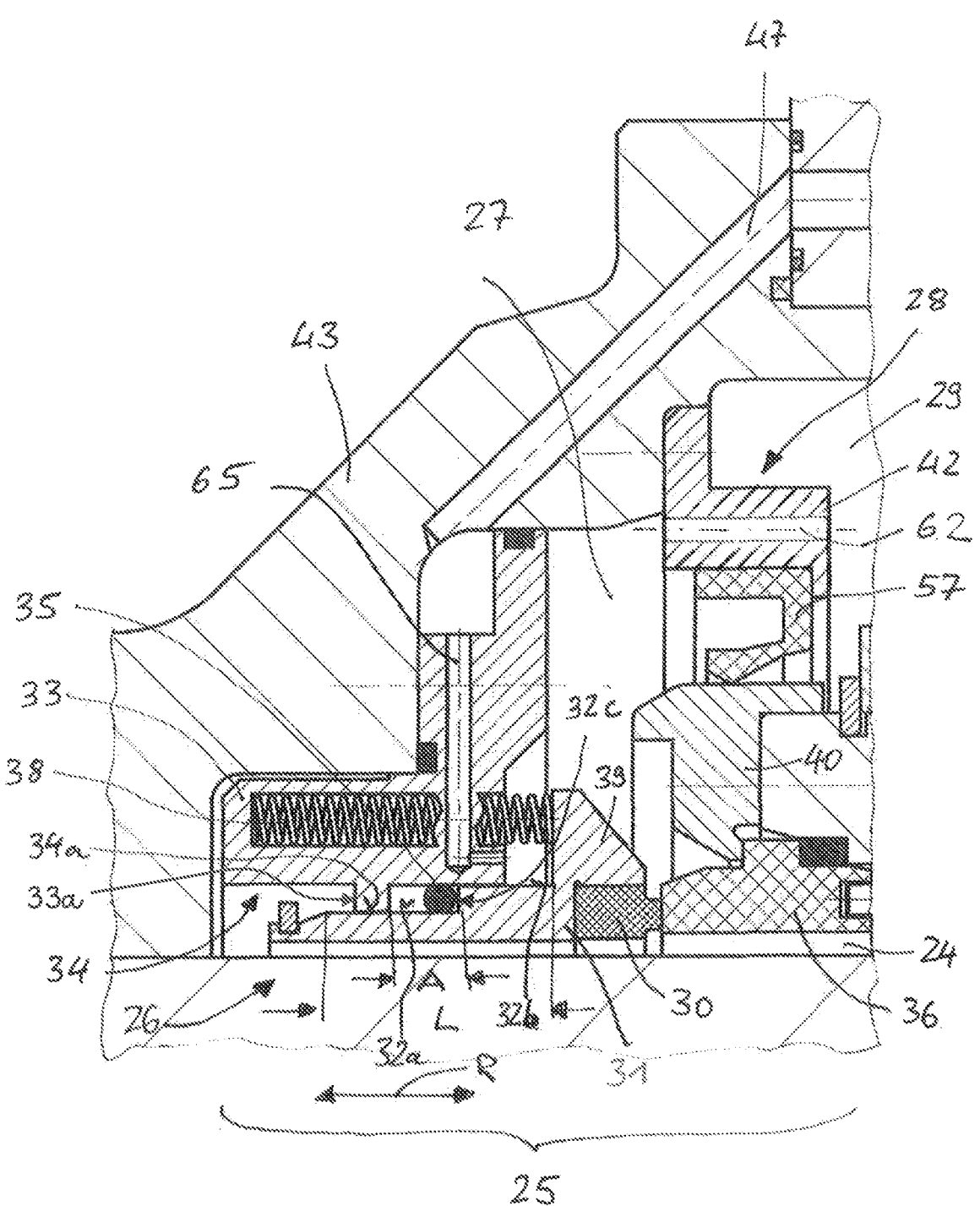
FIG. 6 schematically shows a detail of FIG. 1 with a fourth exemplary embodiment of a seal assembly according to the present invention.
Figure 7:
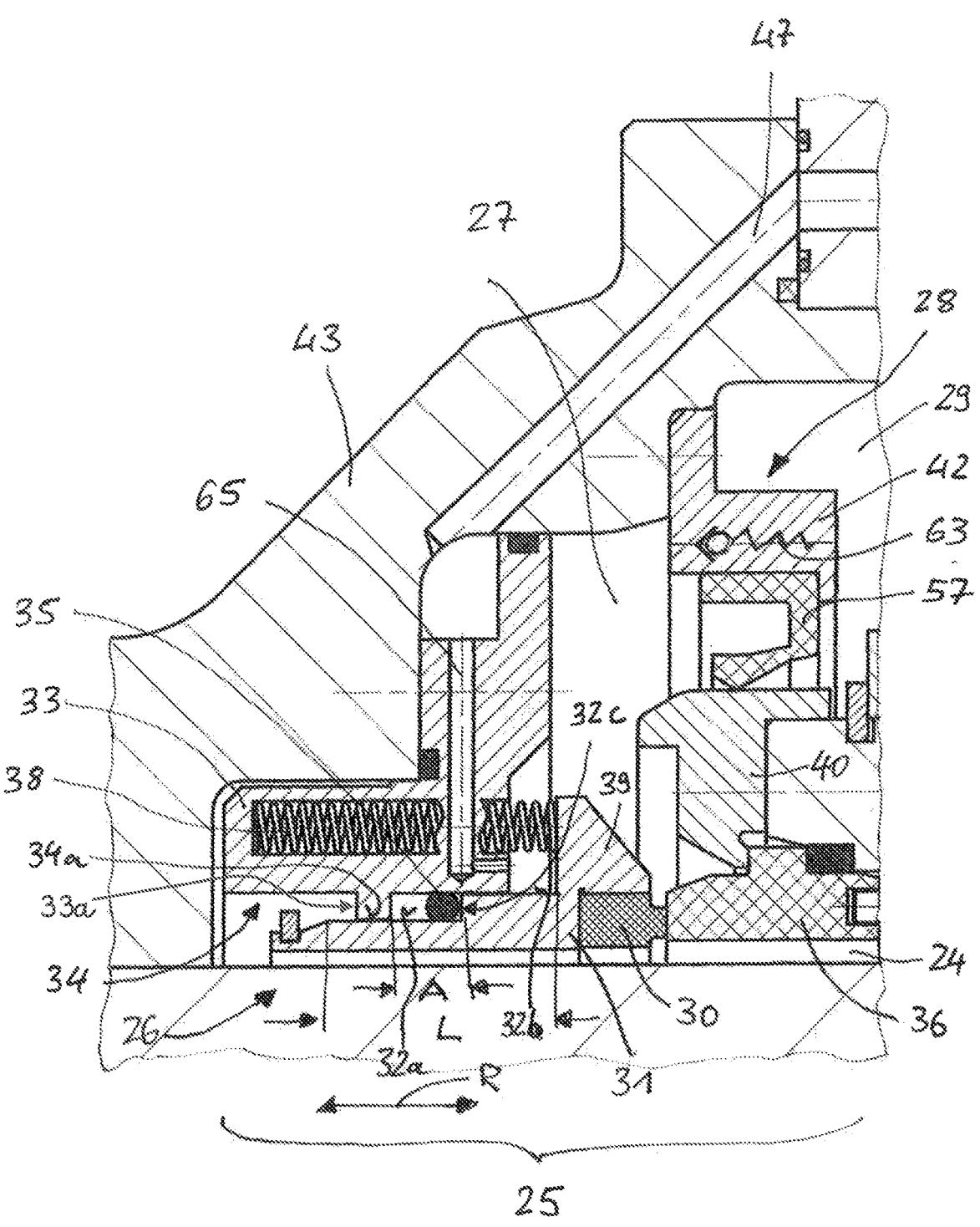
FIG. 7 schematically shows a detail of FIG. 1 with a fifth exemplary embodiment of a seal assembly according to the invention.

In the fourth and fifth exemplary embodiments of a seal assembly 25 according to the present invention shown in FIGS. 6 and 7, the primary seal unit 26 again comprises a rotating face 30, which is likewise guided on a guide ring 31. This has a first lateral surface 32 with a length L which is formed by the first lateral surface 32 of the guide ring. It has regions 32a, 32b with different diameters which are separated from one another via a step 32c.

The primary seal unit 26 also comprises a retaining ring 33. This has a second lateral surface 34 which delimits an inner diameter 34a of the retaining ring 33, which is slightly larger than the region 32b of larger diameter of the first lateral surface 32 of the guide ring 31.

A radial protrusion 33a extends from the second lateral surface 34 of the retaining ring 33 and delimits the inner diameter 34a of the retaining ring 33 which is slightly larger than the region 32a of smaller diameter of the first lateral surface 32 of the guide ring 31. The step 32c and the radial protrusion 33a are spaced from one another in the direction of the length L so that the retaining ring 33 can be displaced relative to the guide ring in the direction R of the length L, leaving a distance A, the minimum value of which at least corresponds to the distance needed to receive a secondary seal 35.

The secondary seal 35 acts between the guide ring 31 and the retaining ring 33. It allows a relative displacement between the retaining ring 33 and the guide ring 31.

For this purpose, the secondary seal 35 comprises a sealing ring 58 which comprises an elastomer material. Owing to the normally required temperature stability, this material is, for example, a perfluorocarbon rubber (FFKM), which is commercially available, for example, under the trade name "Kalrez®".

It has been found that, via such a sealing ring, axial oscillations between the guide ring 31 and the retaining ring 33, which arise, for example, as a result of an axial runout of the rotating face 30 when in rotation, can be absorbed by elastic condition. As a result of such an axial runout, a constant rubbing of the rotating face 30 against the same area of a rotating counter face 36, which could lead to increased wear, is avoided. To press the rotating face 30 against the rotating counter face 36 and to provide the sealing effect, a spring element 37 is again provided which is arranged to act between the retaining ring 33 and the guide ring 31. For this purpose, the spring element 37 comprises a plurality of compressive springs which are mounted in receptacles 38 distributed around the circumference of the retaining ring 33 and act against a shoulder 39 of the guide ring 31.

In order to be able to counteract the wear and aging of the secondary seal 35, axially and radially directed bores 65, which are distributed around the circumference, lead through the retaining ring 33, via which bores 65 in particular cooled oil is supplied to be able to cool the retaining ring 33 in the vicinity of the secondary seal 35. The bores 65 open into the second space 27 so that the oil in the vicinity of the secondary seal 35 can be drained into the second space 27.

In order to at least limit or even avoid a pressure difference which can form between the second space 27 and the discharge space 29, the fourth exemplary embodiment shown in FIG. 6 provides an overflow duct 62 in a flange 42 which is fastened to the bearing bell 43. The overflow duct 62 is arranged so that the oil can pass from the second space 27 into the discharge space 29 at at least virtually the highest level. The overflow duct 62 is in this case designed so that the passage of the oil takes place at least virtually without throttling, depending on its temperature-dependent viscosity.

In the fourth exemplary embodiment of the seal assembly according to the present invention shown in FIG. 6, the dam seal unit 28 comprises a shaft sealing ring 57 which seals off the second space 27 and the discharge space at least substantially from one another. Oil can therefore pass substantially only via the overflow duct 62.

It is likewise possible, however, to install the shaft sealing ring 57 in a manner described in connection with the third exemplary embodiment so that oil can also pass from the second space 27 into the discharge space 29 via a leak of the shaft sealing ring when a certain overpressure is exceeded.

Due to the leak, the sealing lip of the shaft sealing ring 57 is cooled and lubricated, which can lead to a reduction in wear.

In contrast to the fourth exemplary embodiment shown in FIG. 6, to the description of which reference is made in this respect, the fifth exemplary embodiment shown in FIG. 7 has, instead of the overflow duct 62, an overpressure valve 63 which opens a fluid connection between the second space 27 and the discharge space 29 when a certain pressure is exceeded. The overpressure valve 63 can also be arranged in the overflow duct 62.

The present invention is not limited to embodiments described herein; reference should be had to the appended claims.

LIST OF REFERENCE SIGNS

1 Crosshead
2 Hollow roller
3 Inner circumference
4 Outer circumference
5 Pressure chamber
6 Leakage chamber
7 Roller gap
8 Counter roller
9 Longitudinal seal
10 Roller
11 End transverse seal
12 Guide pin
13 Projection
14 Flank
15 Retaining ring
16 Supply line
17 Inlet
18 Outlet
19 Repelling ring
20 Projection
21 Inner circumference
22 Outer circumference
23 Outer circumference
24 First space
25 Seal assembly
26 Primary seal unit
27 Second space
28 Dam seal unit
29 Discharge space
30 Rotating face
31 Guide ring
32 First lateral surface
32*a* Region
32*b* Region
32*c* Step
33 Retaining ring
33*a* Radial protrusion (of retaining ring 33)
34 Second lateral surface
34*a* Inner diameter (of retaining ring 33)
35 Secondary seal
36 Counter face
37 Spring element
38 Receptacle
39 Shoulder
40 Flange
41 Laminar sealing ring
42 Flange
43 Bearing bell
44 Region
45 Region

46 Rotary bearing
47 Supply line
48 Feed
49 Discharge
50 Radial sealing face
51 Sealing face
52 Overpressure valve
53 Split ring
54 Receiving space
55 Sealing gap
56 Sealing lip
57 Shaft sealing ring
58 Sealing ring
59 Annular groove
60 Annular groove
61 Sealing ring
62 Overflow duct
63 Overpressure valve
65 Bore
A Distance
L Length
R Direction

What is claimed is:

1. A roller comprising: a hollow roller which is configured to rotate and which forms a working roller circumference; a crosshead which is not configured to rotate, which penetrates the hollow roller lengthways, and which circumferentially provides a distance from an inner circumference of the hollow roller; pressure and leakage chambers which are formed between the hollow roller and the crosshead, the hollow roller being supported on the crosshead via a pressure and heat transfer liquid which is arranged in the pressure and leakage chambers; a bearing bell which is arranged outside each end of the hollow roller, the bearing bell having a region of a larger inner diameter and an axially adjacent region of a smaller inner diameter toward an outer end of the roller, the crosshead extending into the axially adjacent region of the smaller inner diameter so that the crosshead is mounted on the bearing bell; axial projections arranged on each end of the hollow roller, the axial projections having an outer diameter which is reduced relative to a diameter of the hollow roller and which engage axially with a radial play in the bearing bell in the region of larger inner diameter; a rotary bearing which is arranged on each end of the hollow roller in an engagement region between an outer circumference of the axial projections and the bearing bell, the rotary bearing being configured to rotatably support the hollow roller relative to the bearing bell; and a seal assembly comprising: a primary seal unit which is configured to seal off a first space from a second space, the primary seal unit comprising, a guide ring which comprises a first lateral surface having a length, a rotating face which is guided on the guide ring, a retaining ring which comprises a second lateral surface, the retaining ring being configured to be displaceable relative to the guide ring in a direction of the length of the first lateral surface, and a secondary seal which is configured to act between the guide ring and the retaining ring, wherein, the second lateral surface of the retaining ring is arranged to surround the first lateral surface of the guide ring at least over a part of the length of the first lateral surface; and a dam seal unit which is configured to delimit the second space from a discharge space and so that a liquid introduced into the second space is dischargeable into the discharge space via the dam seal unit, the seal assembly being arranged on an end of the axial projections axially outside of the rotary bearing so as to seal off the first space between an end of the crosshead which projects axially out of the hollow roller and an inner circumference of the axial projections from the second space which is formed by an interior of the region of larger inner diameter of the bearing bell and is adjacent to a discharge space.

2. The roller as recited in claim 1, wherein, the retaining ring is arranged in a rotationally fixed manner on the bearing bell, and the guide ring is arranged displaceably relative to the retaining ring in a direction of the length.

3. The roller as recited in claim 1, further comprising:

a counter face which is arranged in a rotationally fixed manner on the axial projections of the hollow roller.

4. The roller as recited in claim 3, wherein the counter face is arranged eccentrically on one of the axial projections of the hollow roller.

* * * * *